July 11, 1961 R. C. YANTIS 2,992,023
EXPANSION AND MISALIGNMENT COMPENSATING DEVICE
Filed Oct. 18, 1957 3 Sheets-Sheet 1

INVENTOR.
BY ROY C. YANTIS
AGENT

INVENTOR.
ROY C. YANTIS
Noel H Conway
AGENT

July 11, 1961 R. C. YANTIS 2,992,023
EXPANSION AND MISALIGNMENT COMPENSATING DEVICE
Filed Oct. 18, 1957 3 Sheets-Sheet 3

INVENTOR.
ROY C. YANTIS
BY
AGENT

United States Patent Office 2,992,023
Patented July 11, 1961

2,992,023
EXPANSION AND MISALIGNMENT
COMPENSATING DEVICE
Roy C. Yantis, Placentia, Calif., assignor to
North American Aviation, Inc.
Filed Oct. 18, 1957, Ser. No. 690,944
11 Claims. (Cl. 286—1)

This invention relates to devices which will form a seal between a conduit or duct which passes through one or more bulkheads or partitions and yet allow the conduit to be moved longitudinally or laterally or turn at different angles to the bulkhead.

More specifically, this invention relates to a device which not only forms a flexible seal between a conduit passing through a wall, but provides a means to adjust the amount of flexibility of said seal.

When working with fluids in high temperature environments, a problem exists in allowing the conduit or duct which carries the fluid to pass through the walls of the chamber and still permit the duct to expand and contract along its longitudinal axis while retaining a seal between the duct and the wall. This problem is especially acute in modern missiles as the flexible sealing device must not only allow for this relative movement of the duct, but the seal must be light in weight as weight in airborne vehicles is a primary consideration.

The problem of allowing the conduit passing through a wall to expand longitudinally has been met previously by providing cylindrical shaped bellow metal seals which are mounted between the bulkhead and the conduit. However, quite often the conduit has to pass through a wall separating a low pressure area from a high pressure chamber. Therefore, in order to sustain the pressures involved, the metal bellows had to be of such dimensions and material thickness that their spring constants were from 400 to 1200 pounds per linear inch of movement. In many present applications the conduit to be supported is over forty feet long. Therefore, the change in dimension of the conduit due to temperature changes of several hundred degrees causes the conduit to expand along its longitudinal axis upwards of six inches and the loads built up in the bellows due to compression or stretching are too much for the lightweight bulkheads and pump housings of the missiles. Also, when the bellows are located in a fuel tank and when the length of the bellows is decreased by compression the sides of the bellows fold and trap a considerable amount of fuel within these folds thereby increasing the total flying weight of the missile. Another short-coming to the bellows method of sealing is that the duct is not supported in a direction perpendicularly to the longitudinal axis of the duct. That is, the duct receives no lateral support from the wall that it passes through. Therefore, additional supports must be used for this purpose with the corresponding weight increase.

Another problem is providing a means to not only support but insulate the conduit when it is passing through a tank such as a fuel tank. This may be accomplished by the present invention by making the mounting bracket which encircles the conduit take the form of a tube which has provisions to be mounted on the two opposite walls of the chamber around the entrance and exit points of the conduit. Thus the conduit not only is supported and allowed to be moved longitudinally by expansion or other forces but an insulation space separates the conduit from the chamber.

Therefore, it is an object of this invention to provide a device to compensate for misalignment and relative movement between one or more bulkheads and a conduit.

A further object of this invention is to provide a lightweight resilient seal between one or more bulkheads and a conduit which will allow the conduit to move along its longitudinal axis relative to the bulkheads or bulkhead and vary its relative angular relation with the bulkhead.

A still further object of this invention is to provide a lightweight seal between one or more bulkheads and a conduit which will not only allow the duct to move relative to the bulkheads but provide a means of supporting the duct.

Another object of this invention is to provide a means of flexibly supporting a conduit passing through a chamber and insulating the conduit from the chamber.

Other objects of this invention will become apparent in the following detailed description wherein:

FIG. 1 discloses a cross-sectional view of one modification of the device;

Figure 4:
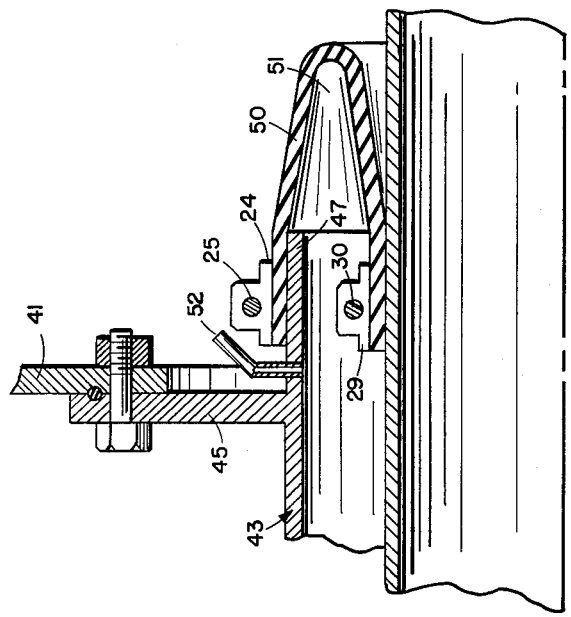
Figure 4:
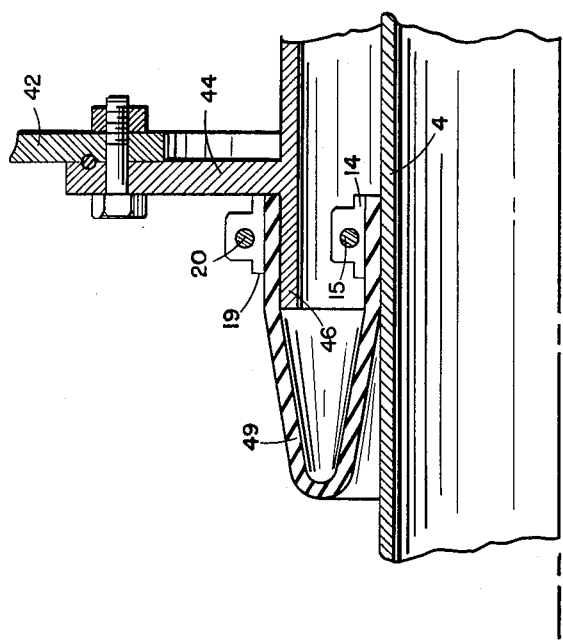

FIG. 4 discloses a cross-sectional view of the device supporting a conduit passing through a tank and providing insulation from the tank's contents.

Figure 1:
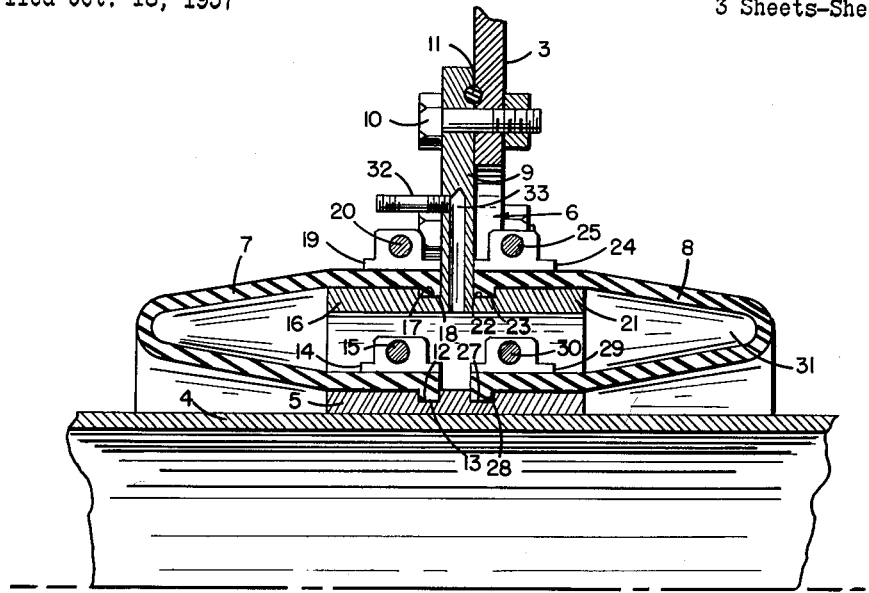

Referring now to FIG. 1, numeral 3 designates a bulkhead. Throughout this specification and claims the term "bulkhead" will be used; however, it should be understood that "bulkhead" is merely used as a generic term for a wall or any type or shape of partition through which the duct is passed. A conduit 4 is provided with a sealing ring 5 around it. This sealing ring 5 is fixed to the duct by any suitable means such as welding, brazing, adhesively bonding, snap rings, or by using gaskets between the ring and duct. Mounting bracket 6 has an aperture having a generally larger internal diameter than sealing ring 5 and is flexibly joined to sealing ring 5 by means of flexible diaphragms 7 and 8 which form an annular chamber with ring 5 and bracket 6. In the unmounted condition these flexible diaphragms have a generally cylindrical shape and are bent to the condition shown forming two generally cylindrical V-shaped flexible elements. The diaphragms may be made of a linen or nylon balloon cloth which is impregnated with a rubber composition to make them flexible and fluid tight. As shown, the cross-sectional length of the operative portion of these diaphragms, that is, the length of the diaphragm along the longitudinal axis of the conduit between the mounting points on the sealing ring and the brackets, is long enough to allow movement of the conduit along its axis relative to the mounting bracket 6. This operative portion should be substantially greater than the radial distance between the point at which the respective diaphragms are mounted on the sealing ring 5 and the bracket 6 when the sealing ring and bracket are in concentric relation.

Mounting bracket 6 is provided with radially extending mounting means such as flange 9 which extends far enough to extend beyond an aperture through the bulkhead 3 so that bolts 10 may be used to seal the flange 9 to bulkhead 3. A rubber sealing washer 11 is normally provided between the flange 9 and bulkhead 3 to provide a seal at that point.

In order that the flexible diaphragm 7 be mounted to sealing ring 5 in a more secure fashion, annular recess 12 is provided in sealing ring 5 to receive inwardly facing annular rib 13 on flexible diaphragm 7. The inward end of the diaphragm 7 and rib 13 are held in sealing relation with the sealing ring 5 by means of clamping ring 14 and bolt 15 as shown.

Mounting bracket 6 is provided with circular flange portion 16 extending along the longitudinal axis of the aperture in the bracket 6. Flange portion 16 is provided with an annular recess 17 which receives inwardly facing annular rib 18 which is located at the outward end of flexible diaphragm 7. Clamping ring 19 encircles the outward end of flexible diaphragm 7 and holds inwardly facing annular rib 18 in sealing engagement with annular recess 17 by means of bolt 20.

In order to mount flexible diaphragm 8 to mounting bracket 6, circular flange portion 21 is provided with an annular recess 22 which receives the inwardly facing annular rib 23 on the outward end of flexible diaphragm 8. This outward end of flexible diaphragm 8 is encircled by clamping ring 24 which holds the outward end of diaphragm 8 in sealing engagement with flange portion 21 by means of bolt 25.

Similar to annular recess 12, annular recess 27 is provided in sealing ring 5 to receive inwardly facing annular rib 28 which is provided on the inward end of flexible diaphragm 8. The inward end of flexible diaphragm 8 is encircled by clamping ring 29 which holds annular rib 28 in sealing engagement with recess 27 by means of bolt 30. Sealing ring 5 is provided in order that the flexible diaphragms 7 and 8 be able to be sealed to the conduit 4 more securely. This is because if the surface of conduit 4 were too rough a good seal could not be obtained. Also, if the surface of conduit 4 were very smooth there would be a chance that the pressure within the annular chamber would "blow out" the flexible diaphragms as the diaphragms through the clamping rings can not grip the smooth surface hard enough to sustain a high internal pressure within the chamber.

With the construction described and shown above, it is seen that annular chamber 31 is formed by mounting bracket 6, sealing ring 5 and flexible diaphragms 7 and 8. This annular chamber is filled with and adapted to contain a fluid such as a gas or liquid to provide a higher pressure within the chamber than outside the chamber to provide the desired flexibility and support. With a six inch conduit 50 p.s.i. was found to work satisfactorily. In order to fill the annular chamber 31 valve 32, which is similar to the valve used in an automobile tire, is provided and communicates with said annular chamber 31 by passageway 33 provided in flange 9. Providing valve 32 in the position shown has the advantage that the fluid pressure within the chamber may be varied easily at any time. It should be appreciated that the compensator could be used without the valve if the chamber were pressurized at first and then sealed, as a chamber which would contain the fluid pressure would still be formed.

Figure 2:
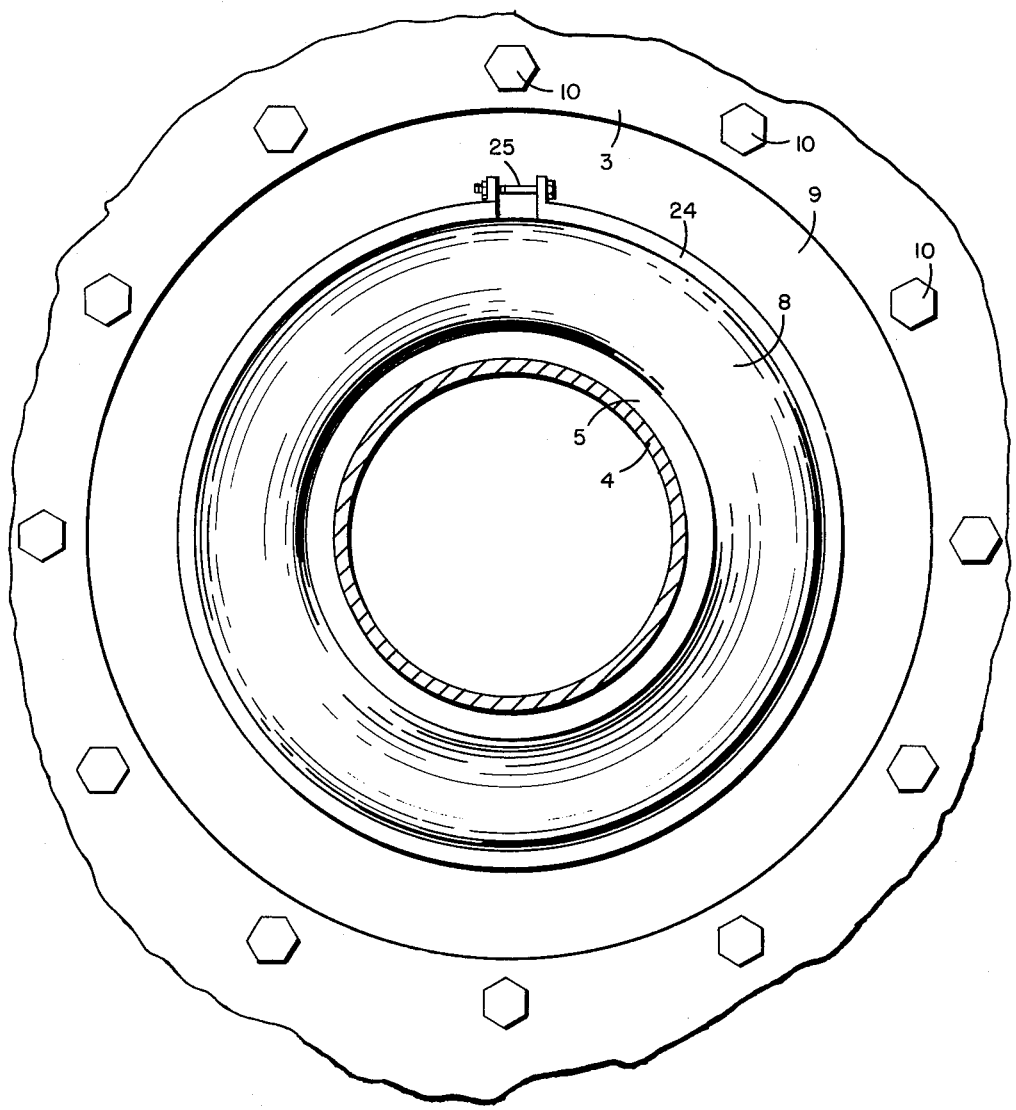
FIG. 2 shows an end view of the modification in FIG. 1.

FIG. 2 shows an end-view of the subject misalignment compensating device encircling a round conduit 4, but naturally if the conduit were of some other cross-sectional shape the device could be correspondingly constructed in order to support the conduit and allow for the longitudinal movement. Therefore, although the device is described and claimed in terms of "encircling," "annular" and "ring," it should be understood that these terms are meant to include members of not only circular shape but any configuration which can surround another object.

Figure 3:
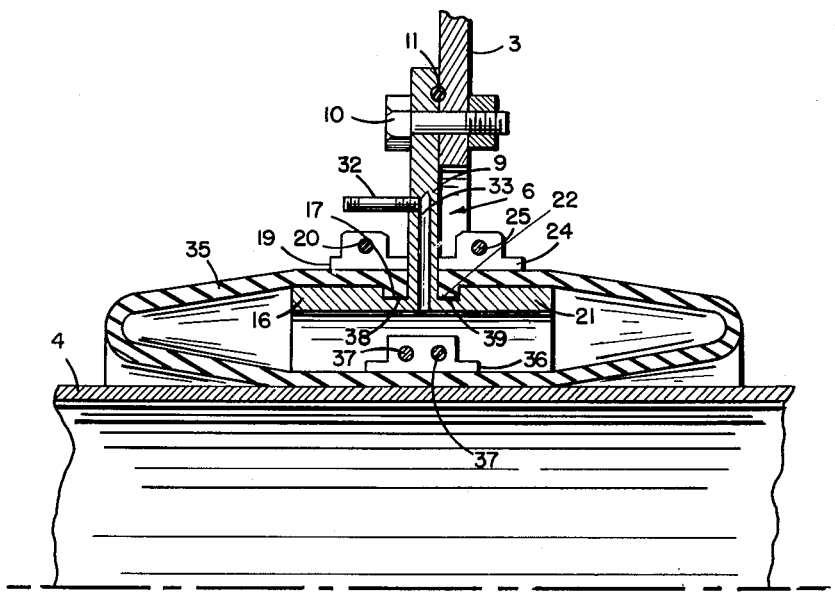
FIG. 3 shows a cross-sectional view of another modification of the device.

FIG. 3 shows another modification of the present invention mainly differing in that instead of two flexible diaphragms a wider single flexible diaphragm 35 is used. In mounting, clamping irng 36 grips flexible diaphragm 35 into sealing relation with conduit 4 by means of bolts 37. The mounting bracket referred to generally as numeral 6 is the same as in the previous modification in that annular recesses 17 and 22 are provided in circular flange portions 16 and 21, respectively, to receive the inwardly facing annular ribs 38 and 39, respectively, of the flexible diaphragm 35. As provided in the other modification, clamping rings 19 and 24 hold the diaphragm in sealing relation with the mounting bracket 6. Since only one diaphragm 35 is used in this modification, if the surface is not too rough no sealing ring is needed as in the other modification and no inwardly facing annular ribs need be provided at the inward section of the diaphragm as needed in the previous modification in order to sustain high internal pressure without the danger of the diaphragm being "blown out." Here, in order to allow sufficient relative movement, the operative cross-sectional length of the diaphragm 35 should be substantially greater than twice the distance between the mounting point on the conduit 4 and the mounting bracket 6 when the bracket 6 is concentric to the conduit 4.

In some applications it is desirable to provide a means for the conduit to pass through a fuel tank or similar chamber and yet be insulated from the fluid in the tank. FIG. 4 shows a modification of the present invention which allows such application. As shown, bulkheads 41 and 42 represent the opposed walls through which the conduit passes. Here the mounting bracket 43 is in configuration of a tube with radially extending flanges 44 and 45 provided to allow the bracket 43 to be mounted to the bulkheads 41 and 42 in the same manner that radially extending flange 9 is provided to allow the bracket 6 to be mounted to the bulkhead 3. As shown, bracket 43 extends beyond the radially extending flanges 44 and 45 to provide circular flange portions 46 and 47, respectively. Thereby, after flexible diaphragm 49 has been secured to the conduit 4 by means of clamping ring 14, the outward end of diaphragm 49 is secured to the circular flange portion 46 by means of clamping ring 19. Similarly, flexible diaphragm 50 is mounted on the conduit 4 at its inward end by means of clamping ring 29 and is mounted at its outward end on the circular flange portion 47 by means of clamping ring 24. In this relation it is seen that an annular chamber is provided surrounding the duct and insulating it from the area within the main tank and the chamber is so constructed that the conduit still may be moved longitudinally relative to the mounting bracket and may change its angular relation to the mounting bracket as required by the operating conditions. Valve 52 is provided so that the annular chamber 51 may be filled with a fluid such as a gas or liquid as in the other modifications.

It should be appreciated that the invention is applicable to any apparatus for providing a flexible seal or mounting between a conduit and a bulkhead through which the conduit passes and although only a few forms of the invention have been shown and described, it will be apparent to those skilled in the art that the invention is not so limited but that various modifications may be made therein without deviating from the spirit of the invention or the scope of the appended claims.

I claim:

1. A conduit support comprising means for forming a resilient annular chamber, said means including an annular mounting bracket adapted to be mounted adjacent a wall aperture, said bracket having an annular opening of less diameter than the aperture and greater diameter than a conduit to be supported, flexible diaphragm means mounted to said bracket and forming two side walls of said chamber, means surrounding and engaging said diaphragm means to mount said diaphragm means to the periphery of the conduit whereby the conduit supported may be moved relative to the bracket in all directions within the limits of said flexible diaphragm means.

2. The invention as claimed in claim 1 wherein the flexible diaphragm means is mounted to the mounting bracket by clamping rings, and at least one clamping ring is provided within said annular chamber and comprises the means for mounting the diaphragm means to the periphery of the conduit.

3. A conduit support comprising means forming an annular chamber adapted to encircle a conduit and form a flexible support between the conduit and at least one bulkhead through which the conduit passes, said annular chamber forming means including: a sealing ring surrounding and mounted to at least part of the peripheral surface of a conduit, a mounting bracket of larger diameter than said sealing ring, at least one flexible diaphragm mounted between the sealing ring and mounting bracket; said chamber being adapted to contain a fluid pressure introduced therein, whereby a conduit may be supported and allowed to move in all directions relative to said mounting bracket.

4. A conduit support comprising a sealing ring of predetermined diameter adapted to be attached to the exterior surface of a conduit, two generally cylindrical V-shaped flexible separate elements adapted to be positioned on opposite sides of a bulkhead each having a cylindrical edge at either end, each having one cylindrical edge mounted to the periphery of said sealing ring, means to mount the opposite circumferential edge of said respective flexible elements to a bulkhead through which the conduit passes, said flexible elements adapted to form a chamber with the sealing ring and bulkhead adapted to contain a fluid pressure.

5. An expansion compensator comprising means forming an annular chamber adapted to encircle a conduit, said annular chamber means including: a mounting bracket having an aperture of larger diameter than the conduit to be supported, said mounting bracket being provided with two circular flange portions extending along the axis of said aperture, said flange portions having annular recesses on their respective peripheral surfaces, flexible diaphragm means having inwardly facing annular ribs mounted to said flange portions, said diaphragm means being adapted to be secured to the periphery of a conduit, said inwardly facing ribs each being located within one of said annular recesses respectively, said chamber being adapted to contain a fluid pressure introduced therein, whereby a conduit supported may be moved relative to the mounting bracket.

6. A misalignment compensator comprising means forming an annular chamber adapted to encircle a conduit in sealing relation, said annular chamber means including: a sealing ring adapted to surround and be sealed to a conduit, a mounting bracket of larger diameter than said sealing ring encircling said ring, two flexible diaphragms mounted to and between said ring and said bracket forming with said ring and bracket an annular chamber, said diaphragms each having an operative cross-sectional length substantially greater than the radial distance between said ring and bracket when said ring and bracket are in concentric relation and means through which fluid may be introduced in the chamber, whereby said ring may be moved away from the center of said bracket and may be moved relative to said bracket along the longitudinal axis of the conduit.

7. A flexible conduit support comprising means forming an annular chamber adapted to encircle a conduit, said annular chamber means including: a sealing ring having at least one annular recess in the surface thereof adapted to be sealed to a conduit, a mounting bracket having an aperture of larger diameter than said sealing ring encircling said ring, said mounting bracket being provided with two circular flange portions extending along the axis of the aperture in the bracket, said flange portions having annular recesses on their peripheral surfaces, two flexible diaphragms having annular ribs mounted to and between said ring and said bracket forming with said ring and bracket an annular chamber, said ribs each being located within one of said annular recesses respectively, said diaphragms each having an operative length substantially greater than the radial distance between said ring and bracket, and means through which fluid may be introduced in the chamber, whereby said ring may be moved away from the center of said bracket and may be moved relative to said bracket along the longitudinal axis of the conduit.

8. A misalignment compensator comprising means forming an annular chamber encircling a conduit and forming a flexible seal between the conduit and at least two bulkheads through which the conduit passes, said chamber means including a mounting bracket having mounting means mounted in sealing relation to said bulkheads, said bracket having an elongated portion joining said mounting means, said bracket having an aperture of predetermined diameter which is larger than the conduit to be encircled, two flexible diaphragms mounted onto said bracket and forming an annular chamber between conduit and said bracket, and means adapted to seal said diaphragms to the conduit encircled, said flexible diaphragms each having an operative length substantially greater than the radial distance between the bracket and the conduit.

9. A flexible support for a member, said support comprising means for forming an annular chamber around a member, said means including flexible imperforate diaphragm means having a first and a second flexible operative length portion extending to form side walls of said chamber, each portion having an inward and a radially outward end, attaching means surrounding and engaging said diaphragm means for clamping said inward ends on to a member to be supported; a mounting bracket extending peripherally around said diaphragm means and including means forming an aperture through which the member to be supported is to extend; and attaching means surrounding and attaching said outer ends onto said mounting bracket.

10. The combination of a partition having aperture means therein; a member passing through said aperture; elongated flexible diaphragm means extending longitudinally and circumferentially of said member; first clamping means clamping a first portion of said diaphragm means in sealing contact with said member; a mounting bracket attached to said partition and radially spaced from said first clamping means; second clamping means cooperating with said mounting bracket clamping a second portion of said flexible diaphragm to said mounting bracket in sealing relation thereto; said diaphragm means having a portion intermediate said first and second portions and of a greater length than the spacing between said mounting bracket and said first and second clamping means, whereby said member is capable of substantial longitudinal movement and said diaphragm forms a seal between the opposite sides of said partition.

11. The combination of claim 10 wherein the first and second clamping means are radially disposed of said member in substantially the same plane.

References Cited in the file of this patent

UNITED STATES PATENTS

| | | |
|---|---|---|
| 1,350,075 | Heath | Aug. 17, 1920 |
| 1,709,949 | Rasmussen et al. | Apr. 23, 1929 |
| 1,767,280 | Fenhouse | June 24, 1930 |
| 2,761,694 | Graham | Sept. 4, 1956 |
| 2,826,919 | Klingler | Mar. 18, 1958 |
| 2,864,258 | Klingler | Dec. 16, 1958 |

FOREIGN PATENTS

| | | |
|---|---|---|
| 292,067 | Great Britain | Oct. 18, 1928 |